United States Patent
Lehmann et al.

(10) Patent No.: US 11,951,974 B2
(45) Date of Patent: Apr. 9, 2024

(54) DRIVE UNIT FOR A DRIVE TRAIN OF AN ELECTRICALLY DRIVEABLE MOTOR VEHICLE, AND DRIVE ASSEMBLY AND MOTOR VEHICLE EQUIPPED WITH SAME

(71) Applicant: Schaeffler Technologies AG & Co. KG, Herzogenaurach (DE)

(72) Inventors: Steffen Lehmann, Ettlingen (DE); Andreas Trinkenschuh, Buhl (DE); Nicolai Gramann, Renchen (DE); Christian Silvery, Walzbachtal (DE); Andreas Bexel, Buhl (DE); Gregor Muller, Buhl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 646 days.

(21) Appl. No.: 17/254,568

(22) PCT Filed: Jun. 4, 2019

(86) PCT No.: PCT/DE2019/100489
§ 371 (c)(1),
(2) Date: Dec. 21, 2020

(87) PCT Pub. No.: WO2019/242800
PCT Pub. Date: Dec. 26, 2019

(65) Prior Publication Data
US 2021/0197795 A1    Jul. 1, 2021

(30) Foreign Application Priority Data

Jun. 20, 2018   (DE) .......................... 102018114798.8

(51) Int. Cl.
*B60W 20/40*    (2016.01)
*B60K 1/00*     (2006.01)
(Continued)

(52) U.S. Cl.
CPC ............... *B60W 20/40* (2013.01); *B60K 1/02* (2013.01); *B60K 6/24* (2013.01); *B60K 6/26* (2013.01);
(Continued)

(58) Field of Classification Search
CPC ...... B60W 20/40; B60W 10/06; B60W 10/08; B60W 10/24; B60K 1/02; B60K 6/24;
(Continued)

(56) References Cited

U.S. PATENT DOCUMENTS 7,637,333 B2    12/2009   Grundl et al.
10,675,962 B2    6/2020   Urabe et al.
2014/0172216 A1*  6/2014  Seto ..................... B60W 20/13
                                                            701/22

FOREIGN PATENT DOCUMENTS

DE       10248715       5/2004
DE       10248715 A1 *  5/2004
(Continued)

OTHER PUBLICATIONS

Text version of DE 10248715 A1 whose paragraph numbers are used in the office action. (Year: 2004).*

*Primary Examiner* — James A Shriver, II
*Assistant Examiner* — Nicholas R. Kandas
(74) *Attorney, Agent, or Firm* — Volpe Koenig (57) ABSTRACT

A drive unit and a drive assembly and a motor vehicle. The drive unit includes a first electric machine and a second electric machine and an output shaft, wherein a rotor of the second electric machine is connected to the output shaft for conjoint rotation. The drive unit further includes a disconnect clutch by which a rotor of the first electric machine can be connected to the output shaft. The drive unit further includes power electronics for controlling at least one of the two electric machines and a flow system for implementing (Continued)

a flow of a coolant, and the drive unit, being a component in the flow system, further includes a heat exchanger by which the coolant can be cooled. The drive unit and the drive assembly constitute equipment that allows control of individual assemblies in an efficient manner and with a low space requirement.

19 Claims, 6 Drawing Sheets

(51) Int. Cl.
| | | |
|---|---|---|
| B60K 1/02 | (2006.01) | |
| B60K 6/24 | (2007.10) | |
| B60K 6/26 | (2007.10) | |
| B60K 6/387 | (2007.10) | |
| B60K 6/405 | (2007.10) | |
| B60K 11/04 | (2006.01) | |
| B60W 10/06 | (2006.01) | |
| B60W 10/08 | (2006.01) | |
| B60W 10/24 | (2006.01) | |

(52) U.S. Cl.
CPC .............. *B60K 6/387* (2013.01); *B60K 6/405* (2013.01); *B60K 11/04* (2013.01); *B60W 10/06* (2013.01); *B60W 10/08* (2013.01); *B60W 10/24* (2013.01); *B60K 2001/006* (2013.01); *B60Y 2200/92* (2013.01); *B60Y 2400/61* (2013.01)

(58) Field of Classification Search
CPC .......... B60K 6/26; B60K 6/387; B60K 6/405; B60K 11/04; B60K 2001/006; B60Y 2200/92; B60Y 2400/61
See application file for complete search history.

(56) References Cited

FOREIGN PATENT DOCUMENTS

| | | | |
|---|---|---|---|
| DE | 10248715 A1 * | 5/2004 | ............... B60K 6/26 |
| DE | 102015222692 | 5/2017 | |
| DE | 102015222694 | 5/2017 | |
| DE | 102017114395.5 | 6/2017 | |
| DE | 112015006071 | 10/2017 | |
| DE | 102017127695.5 | 5/2019 | |
| DE | 102017128289.0 | 6/2019 | |
| JP | 2005104404 | 4/2005 | |
| JP | 2013121788 | 6/2013 | |
| WO | 2015078464 | 6/2015 | |
| WO | 2015078465 | 6/2015 | |
| WO | 2017084888 | 5/2017 | |
| WO | 2017084889 | 5/2017 | |

* cited by examiner

DRIVE UNIT FOR A DRIVE TRAIN OF AN ELECTRICALLY DRIVEABLE MOTOR VEHICLE, AND DRIVE ASSEMBLY AND MOTOR VEHICLE EQUIPPED WITH SAME

CROSS-REFERENCE TO RELATED APPLICATIONS

This application is the U.S. National Phase of PCT Appln. No. PCT/DE2019/100489, filed Jun. 4, 2019, which claims priority to DE 102018114798.8, filed Jun. 20, 2018, the entire disclosures of which are incorporated by reference herein.

TECHNICAL FIELD

The disclosure relates to a drive unit for a drivetrain of an electrically drivable motor vehicle and to a drive assembly which comprises the drive unit according to the invention. The disclosure also relates to a motor vehicle which is equipped with the drive assembly.

BACKGROUND

DE 10 2015 222 692 A1, WO 2017 084 888 A1, DE 10 2015 222 694 A1 and WO 2017 084 889 A1 describe a method for operating a drive device of a hybrid vehicle for driving a drive wheel, wherein the drive device comprises an internal combustion engine, a first electric machine coupled to the internal combustion engine, a second electric machine, an electric accumulator and a main clutch between the internal combustion engine and the drive wheel.

DE 10 2015 222 692 A1 and WO 2017 084 888 A1 describe that the drive device is operated in one of three operating modes, namely in a purely electrical operation, a serial hybrid operation or a parallel hybrid operation, wherein the traction drive torque provided during the change from the first operating mode to the second operating mode corresponds to a suitably selectable curve between the traction drive torque provided before and after the change.

DE 10 2015 222 694 A1 and WO 2017 084 889 A1 disclose that a transmission is also arranged between the internal combustion engine and the drive wheel.

Furthermore, a respective cited document describes a hybrid vehicle which has a hybrid drive device.

The hybrid vehicle described repeatedly in the prior art comprises an internal combustion engine, a first and a second electric machine, at least one drive wheel, a main clutch, and a first and a second clutch. The main clutch is arranged between the internal combustion engine and a drive wheel, the first clutch is provided between the first electric machine and an output shaft of the internal combustion engine, and the second clutch is provided between the second electric machine and a drive wheel.

From DE 10 2017 128 289.0 (not yet published), a drive unit for a drivetrain of a hybrid vehicle is known, with an internal combustion engine, a first electric machine, a second electric machine, a first transmission stage, and a drive shaft of the first electric machine and/or the second electric machine. Furthermore, the drive unit comprises a transmission sub-unit, via which the drive shaft of the respective electric machine is coupled or can be coupled to wheel drive shafts. A second transmission stage is coupled to a countershaft unit, wherein the countershaft unit has an integrated clutch and is further connected to the wheel drive shafts such that the internal combustion engine can be coupled to the wheel drive shafts via the second transmission stage depending on the position of this clutch.

DE 10 2017 127 695.5 (also not yet published) discloses a drivetrain for a hybrid vehicle which has a transmission input shaft which is in an operative relationship via a first partial drivetrain with a first electric machine and an internal combustion engine for torque transmission and which is in an operative relationship via a second partial drivetrain with a second electric machine for torque transmission. The second electric machine is permanently connected to the transmission input shaft so as to transmit torque, and the first electric machine and the internal combustion engine can be connected to the transmission input shaft in a couplable manner for torque transmission. The first electric machine and/or the second electric machine can be designed to be cooled. It is particularly preferred if the cooling is implemented by means of water cooling from a vehicle cooling circuit or by means of oil cooling with transmission oil from the transmission. Furthermore, the disconnect clutch used can also be designed as an oil-cooled multi-plate clutch.

DE 10 2017 114 395.5 (not yet published) discloses an electric drive having a housing and having an electric drive machine for generating a drive torque, which is arranged in the housing and is cooled by means of a coolant. The electric drive also has an electronic unit which is positioned on the housing in such a way that heat generated by the electronic unit can be transferred to coolant in the housing. A cooling system used for this purpose can thus absorb heat from the electronic unit and supply it for cooling, for example in a cooler or heat exchanging device.

The coolant provided for cooling the electric drive machine can also be used for cooling power electronics.

WO 2015/078464 A1 discloses a hybrid module for a hybrid drive unit, wherein the hybrid module can be operated by means of a power electronics module which has power electronics. The power electronics module is arranged on a component of the hybrid module. In particular, it is provided that the power electronics are sealed off from an exterior surrounding the hybrid module and/or from an interior of the hybrid module. It is further provided that a coolant absorbs heat from a flange of a housing of the power electronics component and transports it away.

WO 2015/078465 A1 discloses a hybrid module for a hybrid drive unit, wherein a coolant flow can flow through the hybrid module, which can also flow through a power electronics module for operating the hybrid module. As a result, a separate coolant flow for the hybrid module and the power electronics module can be avoided.

SUMMARY

The object of the disclosure is to provide a drive unit for a drivetrain of an electrically drivable motor vehicle and a drive assembly equipped with same, and a motor vehicle equipped with same, which combine a small space requirement with energy-efficient operation.

This object is achieved by the drive unit having one or more features according to the disclosure and by the drive assembly having one or more features according to the disclosure and by the motor vehicle including one or more features disclosed herein. Advantageous embodiments of the drive unit are listed below and in the claims.

The features disclosed herein may be combined in any technically useful way, including the explanations given in the following description and features of the figures which comprise additional embodiments of the disclosure.

A drive unit for a drivetrain of an electrically drivable motor vehicle, in particular a hybrid vehicle, is provided. The drive unit comprises a first electric machine and a second electric machine and an output shaft, wherein a rotor of the second electric machine is connected to the output shaft for conjoint rotation and wherein the drive unit furthermore has a disconnect clutch with which a rotor of the first electric machine is or can be connected to the output shaft for torque transmission. Furthermore, the drive unit comprises power electronics for controlling at least one of the two electric machines and a flow system for implementing a flow of a coolant for at least partial cooling of the power electronics, wherein the drive unit, as part of the flow system, further comprises a heat exchanger in which the coolant can be cooled.

In this way, the power electronics can be cooled in an efficient manner. For the control connection of the respective electric machine, the power electronics have corresponding connections, which are preferably designed for high-voltage contact.

The two electric machines are preferably arranged coaxially in relation to one another, although the invention does not exclude an axially parallel arrangement of the axes of rotation of the two electric machines.

The flow system is preferably configured to transport oil as a coolant, although the use of other media should not be excluded.

The flow system is designed in such a way that the coolant is directed into the vicinity or through the power electronics in such a way that heat can be transferred from the power electronics to the coolant. The coolant heated to a higher temperature is then fed to the heat exchanging device or heat exchanger, where heat can be given off by the coolant, in particular to a second fluid, which also flows through the heat exchanger.

The disconnect clutch is a switchable clutch that can be switched from an open state to a closed state and vice versa. The disconnect clutch is located in the torque transmission path between the two electric machines.

The drive unit can be designed such that the first shaft firmly connected to the rotor of the first electric machine is arranged radially inside the output shaft firmly connected to the rotor of the second electric machine.

The first shaft can be designed to be divided, namely in the form of a central hollow shaft on which a hub which is connected for conjoint rotation is arranged in some areas, which is also connected to the rotor of the first electric machine for conjoint rotation.

The radial inner side of the disconnect clutch can thus be connected to the hub on the first electric machine for conjoint rotation, and the radial outer side of the disconnect clutch can be connected to the output shaft, which is connected to the rotor of the second electric machine for conjoint rotation.

Furthermore, the drive unit can have a transmission which is in operative connection with the output shaft of the drive unit, also referred to as the transmission input shaft, so that a torque provided by the output shaft or the rotary movement realized by the output shaft can be directed stepped up or stepped down via the transmission to a further transmission unit of a motor vehicle, or can also be transferred directly to drive wheels of a motor vehicle. This transmission can comprise a differential transmission or be designed as such. The transmission can include a first gearwheel, which meshes with external toothing on the output shaft. The first gearwheel thus realizes a transmission stage in the drive unit. This first gearwheel can be coupled to a countershaft of the transmission for conjoint rotation, the external toothing of which in turn meshes with an input gearwheel of a differential transmission, thereby realizing a third transmission stage.

The drive unit preferably comprises a housing in which the two electric machines are arranged at least in some regions, wherein the power electronics are arranged on the radial outer side of the housing. This means that the power electronics are arranged on the outer side of the housing of the drive unit, specifically radially with respect to an axis of rotation of at least one of the two electric machines.

In a further advantageous embodiment of the drive unit, it is provided that the power electronics are configured to control both electric machines. The power electronics are electrically connected to the two electric machines in a corresponding manner.

For optimal integration into a cooling system of a motor vehicle that has the drive unit, it is provided that the flow system has a fluidic interface for connecting the flow system to the cooling system of the motor vehicle to be equipped or which is equipped with the drive unit. This fluidic interface makes it possible to transfer the coolant leaving the heat exchanger to the cooling system of the motor vehicle and feed it into it, so that overall the cooling system of the drive unit is integrated into the cooling system of the motor vehicle equipped with same.

The power electronics can further be configured to control a rotor position sensor and/or a temperature sensor for determining the temperature in at least one of the two electric machines. In a corresponding manner, connections for making contact with these sensors are provided on the power electronics. These connections are preferably designed for the low-voltage range.

The flow system can further be designed in such a way that the coolant can also be fed to the disconnect clutch for the purpose of cooling and/or lubrication.

In an alternative embodiment, it is provided that the flow system and the disconnect clutch are arranged and designed in such a way that the coolant can be fed from the flow system to the disconnect clutch for the purpose of its hydraulic actuation.

The power electronics preferably comprise an electronics housing and at least one connecting element with which the electronics housing is mechanically fixed to the housing of the drive unit.

According to the disclosure, it should not be excluded that a further intermediate layer, such as a sealing element, is located between the connecting element and the electronics housing and/or the connecting element and the housing of the drive unit.

A connecting element is preferably provided for each electric machine and is located on the radial outer side of the respective electric machine.

In this case, the connecting element advantageously also realizes a fluid seal of the housing of the drive unit with respect to the power electronics or a seal for the passage of line elements from the power electronics to the respective electric machine. Correspondingly, the connecting element seals a dry environment in which the power electronics are located or which is encompassed by the power electronics, and a damp area that is formed by the interior encompassed by the housing.

The housing of the drive unit can have further interfaces or bushings for line elements for controlling a hydraulic system, actuator system and/or an electromechanically operated parking lock.

The power electronics are installed in a corresponding manner, namely by placing the connecting elements arranged on the housing of the power electronics onto the housing of the drive unit in the radial direction, or by placing the housing of the power electronics onto connecting elements arranged on the housing of the drive unit in the radial direction.

Furthermore, the power electronics can have at least one control interface for connecting a control device of a motor vehicle and/or an energy store, such as a battery. A plurality of such control interfaces are preferably provided, depending on the number of devices to be connected, such as a control device of a motor vehicle with which the drive unit according to the invention is to be equipped.

In a preferred embodiment, the flow system of the drive unit is formed at least in sections by channels in the housing. This configuration of the drive unit according to the invention enables a correspondingly small space requirement, since no additional line elements need to be provided in these sections.

Another aspect of the present disclosure is a drive assembly with a drive unit having one or more of the features noted herein and with an internal combustion engine, which in particular is indirectly coupled or can be coupled to the rotor of the first electric machine for conjoint rotation.

The internal combustion engine is connected via the first shaft or connected to the first shaft via a further coupling device, if necessary with the interposition of a vibration damper.

Furthermore, the drive assembly according to the disclosure can comprise a transmission or an input element of a wheel drive, wherein the internal combustion engine is or can be mechanically connected via the drive unit to the transmission or the input element of the wheel drive via the disconnect clutch of the drive unit. In a favorable embodiment, the drive assembly comprises at least one wheel drive shaft, which is connected to the output shaft of the drive unit via the transmission, so that a rotary movement realized by the output shaft can be transmitted through the transmission to the wheel drive shaft.

In addition, between the internal combustion engine and a first shaft, which is connected to the rotor of the first electric machine for conjoint rotation, the drive assembly according to the invention can have a first transmission stage for the purpose of converting the speed of the rotary movement realized by the internal combustion engine on the first shaft.

The output element of the internal combustion engine can be a damper unit, or a clutch for opening and closing the torque transmission path between the internal combustion engine and the drive unit, or a combination of a damper unit and a clutch. Furthermore, the output element can have an internally toothed gearwheel as a component, which meshes with an external toothing of the first shaft and thus realizes the first transmission stage.

Another aspect of the present disclosure is a motor vehicle which has a drive assembly according to the invention and a motor vehicle cooling system to which the flow system of the drive unit is fluidically coupled via the fluidic interface.

BRIEF DESCRIPTION OF THE DRAWINGS

The embodiments described above are explained in detail below based on the relevant technical background with reference to the associated drawings, which show preferred embodiments. The disclosure is in no way restricted by the purely schematic drawings, although it should be noted that the embodiments shown in the drawings are not limited to the dimensions shown. In the figures.

DETAILED DESCRIPTION

Figure 1:
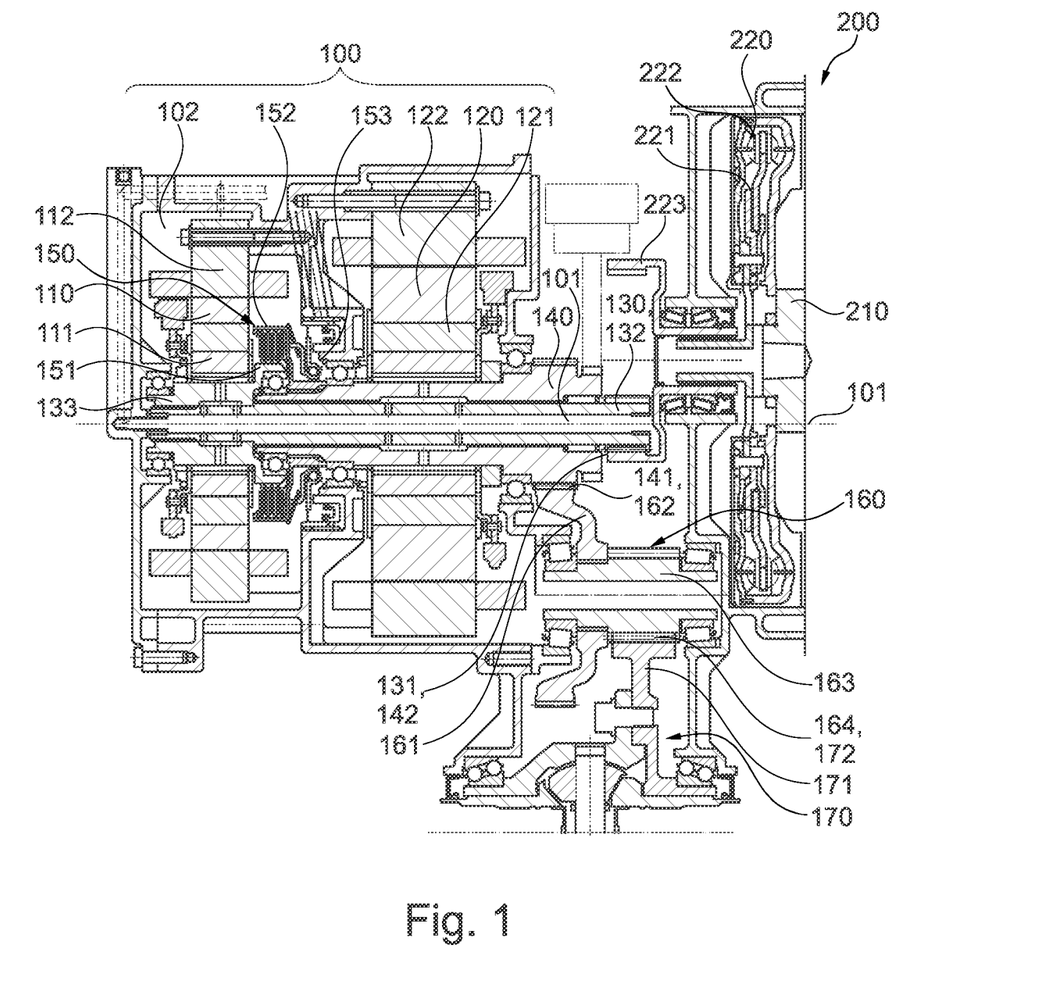
FIG. 1: shows a drive unit according to an embodiment in a sectional view.

FIG. 1 shows a drive unit 100 for a drivetrain of an electrically drivable motor vehicle, in particular a hybrid vehicle, which has a first electric machine 110 and a second electric machine 120, both of which are arranged on a common axis of rotation 101. The rotor 111 of the first electric machine 110 is arranged coaxially to the axis of rotation 101 and also to the rotor 121 of the second electric machine 120. The stator 112 of the first electric machine 110 and also the stator 122 of the second electric machine 120 are accommodated in a housing 102 of the drive unit 100.

The rotor 111 of the first electric machine is connected to a first shaft 130 for conjoint rotation. The rotor 121 of the second electric machine 120 is connected to an output shaft 140 for conjoint rotation, which can also be referred to as a transmission input shaft.

Furthermore, the drive unit 100 comprises a disconnect clutch 150 with which the first electric machine 110 and thus an internal combustion engine connected to the first shaft 130 connected for conjoint rotation to the rotor 111 of the first electric machine 110 can be or is connected to the output shaft for torque transmission.

In the embodiment shown here, the first shaft 130 is designed in two parts, namely made up of a central hollow shaft 132 and a hub 133 positioned on this hollow shaft 132 and connected thereto for conjoint rotation, wherein the hub 133 is also connected to the rotor 111 of the first electric machine 110 in a fixed manner.

The hub 133 forms the radial inner side 151 of the disconnect clutch 150 or is firmly connected to this input side of the disconnect clutch 150.

The radial outer side 152 of the disconnect clutch 150, which realizes the output side of the disconnect clutch 150, is connected to the output shaft 140 for conjoint rotation.

The disconnect clutch 150 is a switchable clutch that can be switched from an open state to a closed state and vice versa. For this purpose, the disconnect clutch 150 is assigned an actuation system 153.

In this way, when the disconnect clutch 150 is closed, a torque can be transmitted from the first shaft 130 to the output shaft 140 or vice versa.

In the embodiment shown here, it is thus provided that the two electric machines 110, 120 are arranged in series, wherein the rotors 111, 121 of the two electric machines 110, 120 or their axes of rotation are arranged coaxially.

The first shaft 130 or its central hollow shaft 132 runs radially inside the output shaft 140, whereby the overall volume required for the drive unit 100 can be made small.

Furthermore, the drive unit 100 shown here comprises a transmission 160 which is in operative connection with the output shaft 140 of the drive unit 100, also referred to as the transmission input shaft, so that a torque made available by the output shaft 140 or the rotary movement realized by the output shaft 140 can be directed stepped up or stepped down via the transmission 160 to a further transmission unit of a motor vehicle, or can also be transferred directly to drive wheels of a motor vehicle.

In the embodiment shown here, this transmission 160 comprises a differential transmission 170.

Furthermore, the transmission 160 comprises a first gearwheel 161, which meshes with an external toothing 141 on the output shaft 140. A second transmission stage 162 is thus realized in the drive unit 100 by the first gearwheel 161. This first gearwheel 161 is coupled to a countershaft 163 of the gear 160 for conjoint rotation, the external toothing 164 of which in turn meshes with an input gearwheel 171 of the differential gear 170, thereby realizing a third transmission stage 172.

The drive unit 100 is part of a likewise illustrated embodiment of a drive assembly 200 according to the invention.

This drive assembly 200 additionally has an internal combustion engine (not shown here) which, when connected to the connection 210 shown, is coupled to the rotor 111 of the first electric machine 110 for conjoint rotation via the first shaft 130 or—with the interposition of a further coupling—can be coupled thereto.

The illustrated drive assembly 200 is designed in such a way that a first transmission stage 142 is formed between the connection 210 for an internal combustion engine (not shown here) and the first shaft 130, which is connected to the rotor 111 of the first electric machine 110 for conjoint rotation, for the purpose of transmitting the speed of the rotary movement realized by the internal combustion engine or its connection 210 to the first shaft 130.

For this purpose, an output element 220 of the internal combustion engine is provided, which can have a damper unit 221 or a clutch 222 for opening and closing the torque transmission path between the internal combustion engine and the drive unit 100, or a combination shown of a damper unit 221 and a clutch 222.

Furthermore, the output element 220 comprises an internally toothed gearwheel 223 as a component, which meshes with an external toothing 131 of the first shaft 130 and thus realizes a first transmission stage 142.

It can be seen that, in the exemplary embodiment shown here, an axis of rotation of the output element 220 is offset laterally to the axis of rotation 101 of the drive unit 100.

In this way, a rotary movement generated by the internal combustion engine (not shown here) can be directed via the output element 220 and the first transmission stage 142 on the first shaft 130, so that the rotor 111 of the first electric machine 110 located thereon can be set in rotary movement in order to operate as a generator.

When the disconnect clutch 150 closes, the applied rotary movement can be transmitted from the first shaft 130, possibly amplified by an electric motor drive through the first electric machine 110, to the output shaft 140. Because of the conjointly rotating connection of the rotor 122 of the second electric machine 120 to the output shaft 140, a torque provided by the second electric machine 120 can also be applied to the output shaft 140.

Alternatively, when the disconnect clutch 150 is opened, only the second electric machine 120 can be operated alone in order to rotate the output shaft 140.

The rotary movement of the output shaft 140 is directed via its external toothing 141 to the first gear 161 of the connected gear 160, wherein the second transmission stage 162 is realized.

From the first gear 161, the torque or the rotary movement is directed to the countershaft 163, from which it is fed to the differential transmission 170 via the input gearwheel 171.

The torque is transferred from the differential transmission 170 to the wheel drive shafts (not shown here) or, if necessary, a further transmission to step up or down the torque or the speed.

The illustrated drive assembly 200 can realize a wide variety of driving states, such as operation of the internal combustion engine alone to drive a motor vehicle, or with the addition of the second electric machine and/or the first electric machine, as well as simultaneous generator operation of the first electric machine during operation of the internal combustion engine and/or the second electric machine, as well as operation of the second electric machine alone, or recuperation operation of the first electric machine and/or the second electric machine.

Figure 2:
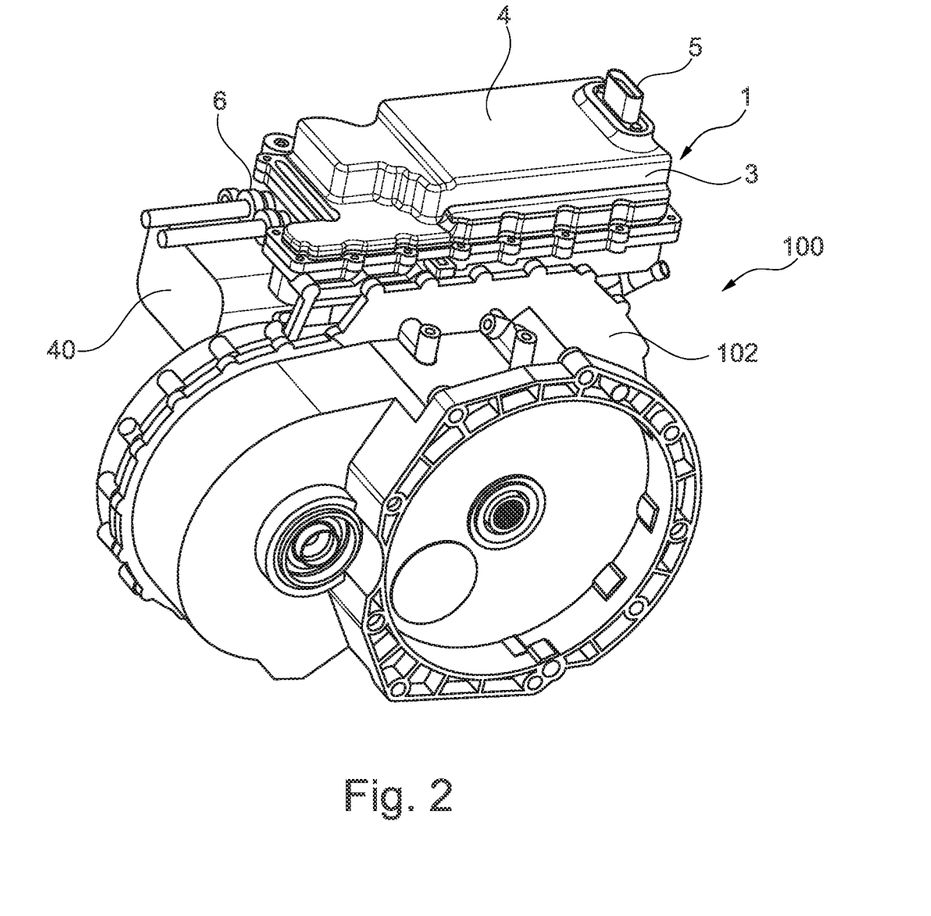
FIG. 2: shows a drive unit according to an embodiment in a perspective view.

FIG. 2 shows a drive unit in a perspective view, in which it can be clearly seen that the power electronics 1 are arranged radially outside on the housing 102 and are located in an electronics housing 3 which is closed with a cover 4.

A battery connection 6 is located on the power electronics 1, which thus forms a control interface for connecting an energy store.

In the cover 4 of the electronics housing 3, a connection 5 is provided to a vehicle control unit (not shown here) which can in particular be designed as a so-called CAN connection. This connection to a vehicle control unit 5 is thus also a control interface for the controlling connection with the motor vehicle, in which the drive unit according to the invention is to be integrated.

Mechanically connected to the power electronics 1, a heat exchanger 40 is also provided, which can be designed as a heat exchanging device.

Figure 3:
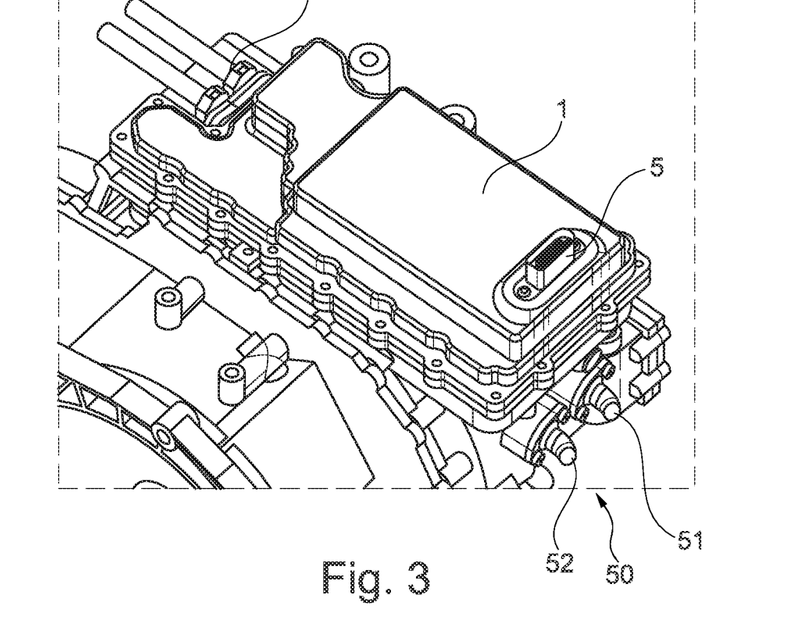
FIG. 3: shows a detail from the drive unit shown in FIG. 2 in a perspective view.

FIG. 3 shows the power electronics again in a perspective view, wherein the coolant connection 50 is clearly visible here, which forms a fluidic interface for connecting the power electronics to a cooling system. This coolant connection 50 comprises an inlet 51 into the housing 102 for the inlet of the coolant, as well as an outlet 52 from the housing 102 for the outlet of the coolant.

Figure 4:
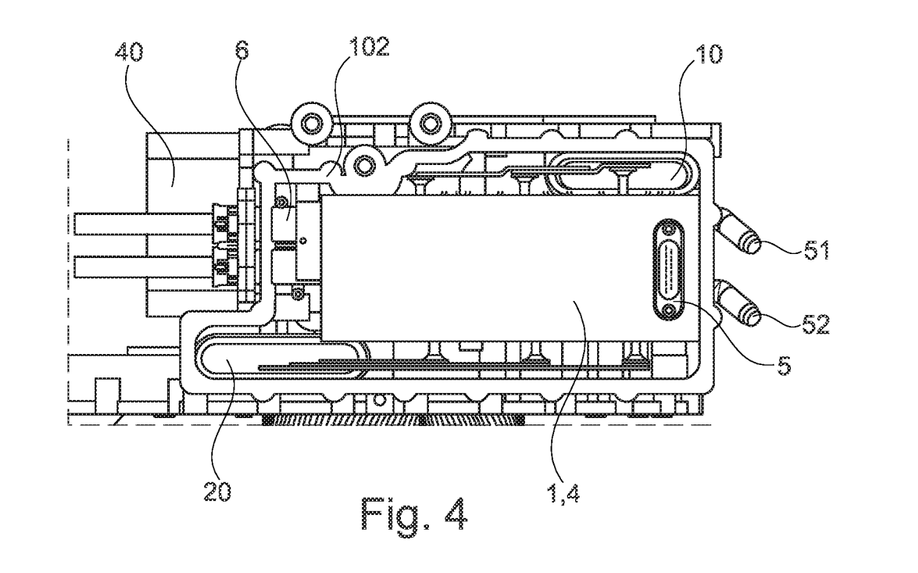
FIG. 4: shows a plan view of the power electronics.

FIG. 4 shows the power electronics in the assembled state from above, wherein a first connecting element 10 assigned to the first electric machine is clearly visible here as well as a second connecting element 20 assigned to the second electric machine. These connecting elements 10, 20 are used for the mechanical connection and, if necessary, also for the fluid sealing of the power electronics 1 on the housing 102.

Figure 5:
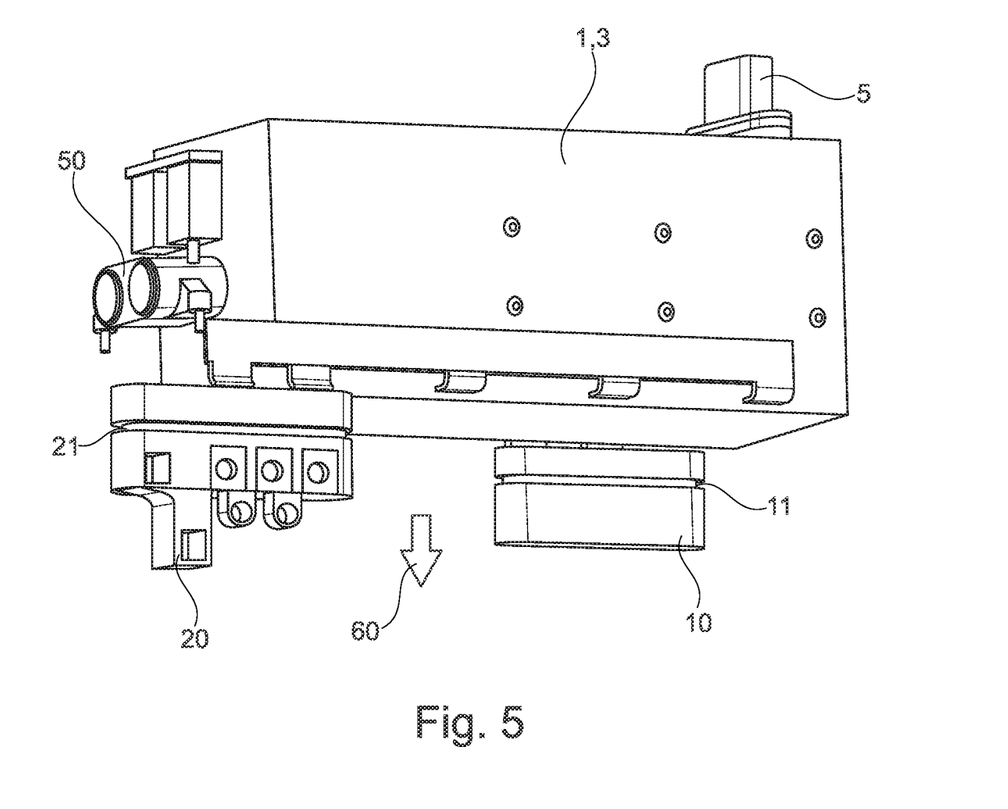
FIG. 5: shows the power electronics alone in a perspective view.

The connecting elements 10, 20 can be seen more clearly in FIG. 5, which shows the power electronics 1 in a perspective view. It can be seen here that the two connecting elements 10, 20 are arranged on the underside of the electronics housing 3, wherein these are sealed off from the electronics housing 3 by a first radial seal 11 and a second radial seal 21.

Furthermore, the assembly direction 60 can be seen from FIG. 5, which indicates that the electronics unit 1 is to be placed in the radial direction on the housing 102 of the drive unit 100 during assembly.

Figure 6:
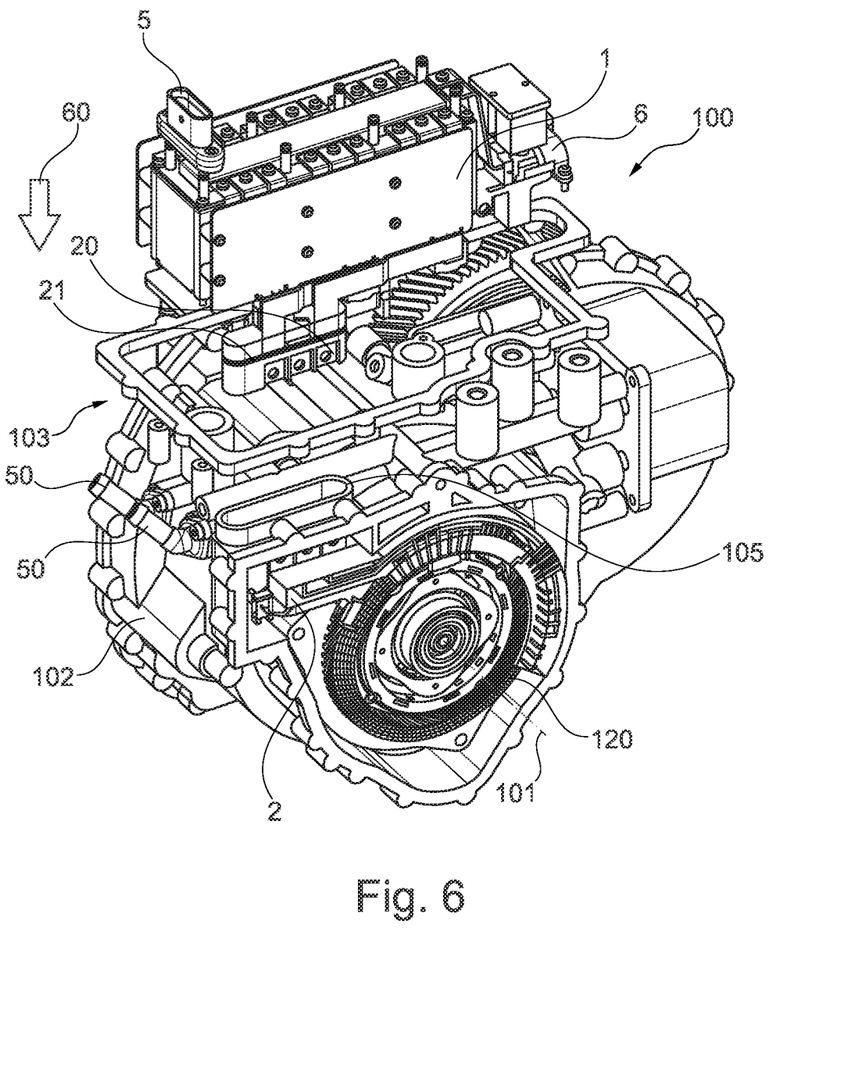
FIG. 6: shows the drive unit according to an embodiment and the power electronics prior to assembly in a perspective view.

FIG. 6 essentially shows the assembly process, wherein the assembly direction 60 is also indicated here in order to show that during assembly the power electronics 1 is approached in the radial direction of the radial outer side 103 of the housing 102, wherein radial direction is to be understood as a direction perpendicular to the axis of rotation 101.

It can also be seen that, when this movement is carried out along the assembly direction 60, the second connecting element 20 comes into engagement with a receptacle 105 in the housing 102, which forms a counter-sealing surface for the connecting element 20.

Figure 7:
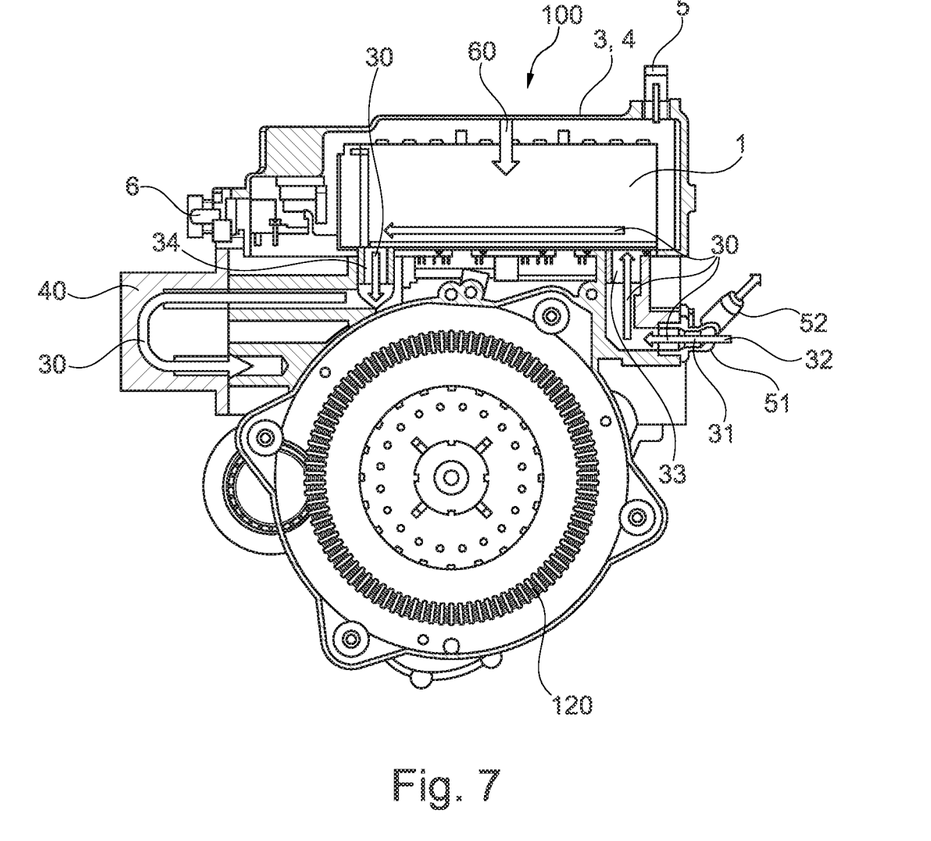
FIG. 7: shows a sectional view of the drive unit.

FIG. 7 shows the flow system 30 in a section through the drive unit 100. It is defined by a flow path 32 which leads through channels 104 in the housing 102. Coolant 31 is directed through these channels 104.

It can be seen that the coolant 31 enters the housing 102 through the inlet 51 and then passes through an inlet 33 into the power electronics 1 or into the electronics housing 3. There the coolant 31 flowed through the electronics housing and passes through an outlet 34 back into a channel in the housing 102.

From there, the coolant 31 passes into the heat exchanger 40, where the heat absorbed by the coolant 31 is given off, preferably to a further fluid, which is not shown here and also flows through the heat exchanger 40.

Thereafter, the coolant 31 can be transmitted (in a manner not shown) to a cooling system of a motor vehicle in which the drive unit is integrated.

The present drive unit and the drive assembly equipped with same constitute equipment that allows control of individual assemblies of the drive unit in an efficient manner and with a low space requirement.

LIST OF REFERENCE SYMBOLS

1 Power electronics
2 Control connection
3 Electronics housing
4 Cover of the electronics housing
5 Connection to the vehicle control unit
6 Battery connection
10 First connecting element
11 First radial seal
20 Second connecting element
21 Second radial seal
30 Flow system
31 Coolant
32 Flow path
33 Inlet into the power electronics
34 Outlet from the power electronics
40 Heat exchanger
50 Coolant connection
51 Inlet into the housing
52 Outlet from the housing
60 Assembly direction
100 Drive unit
101 Axis of rotation
102 Housing
103 Radial outer side of the housing
104 Channel in the housing
105 Receptacle
110 First electric machine
111 Rotor of the first electric machine
112 Stator of the first electric machine
120 Second electric machine
121 Rotor of the second electric machine
122 Stator of the second electric machine
130 First shaft
131 External toothing of the first shaft
132 Central hollow shaft
133 Hub
140 Output shaft
141 External toothing of the output shaft
142 First transmission stage
150 Disconnect clutch
151 Radial inner side of the disconnect clutch
152 Radial outer side of the disconnect clutch
153 Actuation system
160 Transmission
161 First gearwheel
162 Second transmission stage
163 Countershaft
164 External toothing of the countershaft
170 Differential transmission
171 Input gearwheel
172 Third transmission stage
200 Drive assembly
210 Connection for an internal combustion engine
220 Output element
221 Damper unit
222 Clutch
223 Internally toothed gearwheel

The invention claimed is:

1. A drive unit for a drivetrain of an electrically drivable motor vehicle, the drive unit comprising:
a first electric machine having a rotor;
a second electric machine having a rotor;
a housing in which the first electric machine and the second electric machine are arranged at least in some regions;
an output shaft to which the rotor of the second electric machine is connected for conjoint rotation; a disconnect clutch by which the rotor of the first electric machine is connectable to the output shaft for torque transmission;
power electronics configured to control at least one of the two electric machines_, wherein the power electronics are arranged on a radial outer side of the housing;
a flow system configured to implement a flow of a coolant for at least partial cooling of the power electronics; and
a heat exchanger adapted to cool the coolant.

2. The drive unit according to claim 1, wherein the power electronics are configured to control both electric machines.

3. The drive unit according to claim 1, wherein the flow system has a fluidic interface adapted for connecting the flow system to a cooling system of a motor vehicle to be equipped with the drive unit.

4. The drive unit according to claim 1, wherein the power electronics are further configured to control at least one of a rotor position sensor or a temperature sensor configured for determining a temperature in at least one of the two electric machines.

5. The drive unit according to claim 1, wherein the power electronics comprise an electronics housing and at least one connecting element with which the electronics housing is mechanically fixed to the housing of the drive unit.

6. The drive unit according to claim 1, wherein the power electronics have at least one control interface configured for connecting to at least one of a control device of a motor vehicle or an energy store.

7. The drive unit according to claim 1, wherein the flow system is formed at least partially by channels in the housing.

8. A drive assembly comprising: a drive unit according to claim 1, and an internal combustion engine that is couplable to the rotor of the first electric machine for conjoint rotation.

9. A motor vehicle comprising: a drive assembly according to claim 8, and a motor vehicle cooling system to which the flow system of the drive unit is fluidically coupled via a fluidic interface of the flow system.

10. A drive unit for a drivetrain of an electrically drivable motor vehicle, the drive unit comprising:
a first electric machine having a rotor;
a second electric machine having a rotor;
a housing in which the first electric machine and the second electric machine are arranged within;
an output shaft to which the rotor of the second electric machine is connected for conjoint rotation;
a disconnect clutch by which the rotor of the first electric machine is connectable to the output shaft for torque transmission;
power electronics configured to control at least one of the two electric machines, the power electronics being arranged in an electronics housing, wherein the power electronics comprises at least one connecting element with which the electronics housing is mechanically fixed to the housing of the drive unit;
a flow system configured to implement a flow of a coolant for at least partial cooling of the power electronics; and
a coolant connection of the flow system in the electronics housing.

11. The drive unit according to claim 10, further comprising a heat exchanger connected to the flow system.

12. The drive unit according to claim 10, wherein the electronics housing is arranged on the housing.

13. The drive unit according to claim 12, wherein the flow system is formed at least partially by channels in the housing.

14. The drive unit according to claim 10, wherein the flow system has a fluidic interface adapted for connecting the flow system to a cooling system of a motor vehicle.

15. The drive unit according to claim 10, wherein the power electronics are configured to control both electric machines.

16. The drive unit according to claim 10, wherein the power electronics are further configured to control at least one of a rotor position sensor or a temperature sensor configured for determining a temperature in at least one of the two electric machines.

17. The drive unit according to claim 10, wherein the power electronics have at least one control interface configured for connecting to at least one of a control device of a motor vehicle or an energy store.

18. A drive unit for a drivetrain of an electrically drivable motor vehicle, the drive unit comprising:
a first electric machine having a rotor;
a second electric machine having a rotor;
a first shaft to which the rotor of the first electric machine is connected for conjoint rotation;
an output shaft to which the rotor of the second electric machine is connected for conjoint rotation, wherein the first shaft is positioned radially inside the output shaft;
a disconnect clutch by which the rotor of the first electric machine is connectable to the output shaft for torque transmission;
power electronics configured to control at least one of the two electric machines;
a flow system configured to implement a flow of a coolant for at least partial cooling of the power electronics; and
a heat exchanger adapted to cool the coolant.

19. The drive unit according to claim 18, wherein:
the first electric machine includes stator; and
the second electric machine includes a stator;
wherein the rotor of the first electric machine is positioned closer to an axis of rotation of the drive unit than the stator of the first electric machine, and the rotor of the second electric machine is positioned closer to the axis of rotation of the drive unit than the stator of the second electric machine.

\* \* \* \* \*